United States Patent
Hund et al.

(10) Patent No.: US 7,883,603 B2
(45) Date of Patent: Feb. 8, 2011

(54) METHOD FOR MAKING PAPER AND CARDBOARD WITH HIGH DRY STRENGTH AND RESULTING PAPERS AND CARDBOARDS

(75) Inventors: Rene Hund, Villars (FR); Christian Jehn-Rendu, St. Marcellin en Forez (FR); Fabrice Moretton, Lyons (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 725 days.

(21) Appl. No.: 11/816,599

(22) PCT Filed: Jan. 31, 2006

(86) PCT No.: PCT/FR2006/050079

§ 371 (c)(1),
(2), (4) Date: Aug. 17, 2007

(87) PCT Pub. No.: WO2006/090076

PCT Pub. Date: Aug. 31, 2006

(65) Prior Publication Data

US 2008/0156448 A1    Jul. 3, 2008

(30) Foreign Application Priority Data

Feb. 24, 2005  (FR) .................................. 05 50514

(51) Int. Cl.
*D21H 15/00* (2006.01)

(52) U.S. Cl. .............. 162/164.6; 162/168.1; 162/168.2; 162/168.3; 162/164.1; 525/343; 525/328.4; 525/329.2

(58) Field of Classification Search .............. 162/164.1, 162/164.6, 168.1–168.3; 525/328.4, 329.2, 525/343

See application file for complete search history.

(56) References Cited

U.S. PATENT DOCUMENTS

| 5,185,062 | A | | 2/1993 | Begala |
| 5,584,966 | A | * | 12/1996 | Moffett .................. 162/168.1 |
| 2004/0118540 | A1 | * | 6/2004 | Garnier et al. ........... 162/164.1 |

FOREIGN PATENT DOCUMENTS

| JP | 58060094 | | 4/1983 |
| JP | 0377313 | A2 * | 11/1990 |
| JP | 4057992 | | 2/1992 |

OTHER PUBLICATIONS

International Search Report based off of priority PCT/FR 2006/050079.

* cited by examiner

*Primary Examiner*—Matthew J Daniels
*Assistant Examiner*—Jacob Thomas Minskey
(74) *Attorney, Agent, or Firm*—Heslin Rothenberg Farley & Mesiti PC

(57) ABSTRACT

A method for making a sheet of paper and/or cardboard and the like, comprises, prior to forming said sheet, adding to the fibrous suspension, separately or mixed, in any sequence of introduction, into one or more injection points, at least three dry strength agents respectively: first agent corresponding to a (co)polymer having a cationic filler density higher than 1 meq/g and exhibiting primary amine functions; a second agent corresponding to a synthetic organic (co)polymer having cationic filler density higher than 0.1 meq/g; and a third agent corresponding to a (co)polymer having an anionic filler density higher than 0.1 meq/g.

25 Claims, No Drawings

METHOD FOR MAKING PAPER AND CARDBOARD WITH HIGH DRY STRENGTH AND RESULTING PAPERS AND CARDBOARDS

CROSS REFERENCE TO RELATED APPLICATIONS

This is a Section 371 filing of International Application No. PCT/FR2006/050079 filed Jan. 31, 2006, and published, in French, as International Publication No. WO 2006/090076 A1 on Aug. 31, 2006, and claims priority of French Application No. 0550514 filed on Feb. 24, 2005, all of which applications are hereby incorporated by reference herein, in their entirety.

BACKGROUND ART

The invention relates to a paper having an improved dry strength and its method of fabrication, characterized by the use of a three-component system comprising at least two polymers mainly having cationic fillers and at least one overall anionic polymer. These polymers are combined to exert a synergistic action on the dry strength of this paper.

More precisely, the invention relates to an improved method for fabricating paper and/or cardboard and the like, in which at least three (co)polymers are used to improve the dry strength characteristics during the fabrication of cellulose sheets, respectively:

- at least one first agent corresponding to a (co)polymer having a cationic filler density higher than 1 meq/g and having primary amine functions,
- at least one second agent corresponding to a synthetic organic (co)polymer having a cationic filler density higher than 0.1 meq/g,
- and at least one third agent corresponding to a (co)polymer having an anionic filler density higher than 0.1 meq/g.

According to the invention, the (co)polymer having primary amine functions is conventionally obtained organic polymer and well known to a person skilled in the art, such as for example—by a Hofmann degradation reaction on a base (co)polymer—or by acidic or basic hydrolysis of a base (co) polymer of polyvinylformamide, and derivatives thereof.

The three-component system can be used successfully for fabricating papers and cardboards, coated paper supports, any type of paper, cardboard and the like requiring improved dry strength.

Ongoing efforts are being made to papers and cardboards which are increasingly strong, particularly for the packaging industry.

The dry strength of the paper is, by definition, the strength of the normally dry sheet. The values of the burst strength and tensile strength conventionally give a measurement of the dry strength of the paper.

The use of water-soluble cationic polymers for improving the strength characteristics of paper is well known. Due to their nature, they can be fixed directly on the anionic cellulose and give it a cationic filler so that in combination with anionic polymers, the latter are fixed on the cellulose fibres, thereby improving the dry strength of the sheet.

The most commonly used cationic polymers are compounds of the cationic starch type, polyamide epichlorhydrin (PAE), polyamide amine epichlorhydrin (PAAE) or cationic polyacrylamides, optionally glyoxalated.

However, the methods described in the prior art using these polymers are not fully satisfactory, particularly concerning the quantities of polymers required and/or the wet strength characteristics obtained, giving rise to process difficulties such as reduction of the sheet to pulp for recycling the dry fragments. The latter drawback is observed in particular when the method described in document US 2004/118540 is implemented.

The burst strength of the cellulose sheets obtained by the use of dry strength agents also meets a number of requirements. It must in particular have no toxicological drawbacks and have good compatibility with the other agents used in the fabrication of the sheet.

It has already been proposed, particularly in patent applications JP 58-60094 (Hamano), JP 04-57992 (Mitsui), US 2004/118540 (Kimberly Clark) to combine, in two-component type systems, polymers having vinyl amine type functions with an anionic polymer, this combination being intended to propose an efficient system for the dry strength of the paper sheet.

BRIEF SUMMARY OF THE INVENTION

The invention relates to a method for fabricating paper characterized by the use of a system that is not a two-component but a three-component system comprising at least two polymers mainly containing cationic fillers and at least one overall anionic polymer, thereby unexpectedly improving the dry strength properties of the paper while being economically less expensive.

The applicant has found and developed an improved method for fabricating a sheet of paper and/or cardboard and the like, which consists, before the formation of the said sheet, in adding to the fibrous suspension, separately or mixed when two agents are compatible, in any order of introduction, at least one or more injection points, at least three dry strength agents respectively:

- a first agent corresponding to a (co)polymer having a cationic filler density higher than 1 meq/g and having primary amine functions,
- a second agent corresponding to a synthetic organic (co) polymer having a cationic filler density higher than 0.1 meq/g,
- and a third agent corresponding to a (co)polymer having an anionic filler density higher than 0.1 meq/g.

For greater clarity, in the rest of the description, in the examples and in the claims, the (co)polymer having a cationic filler density higher than 1 meq/g and having primary amine functions is designated "first agent" or "polyvinylamine" although it may be introduced into the fibrous suspension after the third agent called "third agent" and vice versa. The same applies to the "second agent".

The second agent is a synthetic organic (co)polymer resulting from a free radical polymerization process.

As emphasized previously, the invention relates to an improved method which consists, during the very preparation of the paper, in incorporating in the fibrous suspension or mass or paper pulp, as dry strength agents, in any order whatsoever:

- 0.01 to 2% by weight of active polymer matter compared to the dry weight of the fibrous suspension, at least one (co)polymer having a cationic filler density higher than 1 meq/g and having primary amine functions,
- 0.01 to 2% by weight of active polymer matter compared to the dry weight of the fibrous suspension, of at least one synthetic organic (co)polymer having a cationic filler density higher than 0.1 meq/g, and 0.01 to 2% by weight of active polymer matter compared to the dry weight of the fibrous suspension, of at least one (co)polymer having an anionic filler density higher than 0.1 meq/g.

Very unexpectedly, the inventive method serves to obtain performance levels unequalled, with similar proportions, for dry strength in paper applications.

In particular, the inventive method serves to obtain very high burst strength and tensile strength without any negative side effects.

DETAILED DESCRIPTION

A. The "First" Dry Strength Agent: the (Co)Polymer Having a Cationic Filler Density Higher than 1 Meq/g and Having Primary Amine Functions.

This is a water-soluble polymer having at least 1 meq/g of primary amine function.

1. One method for preparing this polymer is the Hofmann degradation reaction on a base (co)polymer, well known to a person skilled in the art (FR 05.50135, JP 58-60094, JP 04-57992).

In practice, the base polymer used comprises:

at least one nonionic monomer selected from the group comprising acrylamide (and/or methacrylamide), N,N dimethylacrylamide and/or acrylonitrile, and optionally:

at least one unsaturated cationic ethylene monomer, preferably selected from the group comprising monomers of the dialkylaminoalkyl (meth)acrylamide, diallylamine, methyldiallylamine and their quaternary ammonium or acidic salts. Mention can be made in particular of dimethyldiallylammonium chloride (DADMAC), acrylamido propyltrimethyl ammonium chloride (APTAC) and/or methacrylamido propyltrimethyl ammonium chloride (MAPTAC), and/or at least one other nonionic monomer preferably selected from the group comprising N-vinyl acetamide, N-vinyl formamide, N-vinylpyrrolidone and/or vinyl acetate, and/or at least one anionic monomer of the acid or anhydride type selected for example from the group comprising (meth)acrylic acid, acrylamidomethylpropane sulphonic acid, itaconic acid, maleic anhydride, maleic acid, methallylsulphonic acid, vinylsulphonic acid and salts thereof.

It is important to note that, in combination with these monomers, it is also possible to use monomers insoluble in water such as acrylic, allyl or vinyl monomers comprising a hydrophobic group. During their use, these monomers are employed in very small quantities, lower than 20 moles percent, preferably lower than 10 moles percent, and they are preferably selected from the group comprising derivatives of acrylamide such as N-alkylacrylamide for example N-tert-butylacrylamide, octylacrylamide as well as N,N-dialkylacrylamides such as N,N-dihexylacrylamide, and derivatives of acrylic acid such as alkyl acrylates and methacrylates.

In a manner known per se, the base polymer may also be branched. As is well known, a branched polymer is a polymer having branches, groups or branchings from its main ring, roughly arranged in a plane.

The branching can preferably be carried out during (or optionally after) the polymerization, in the presence of a branching agent and optionally a transfer agent. A non-limiting list of branching agents is given below: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxy or any other means well known to a person skilled in the art permitting cross-linkage.

In practice, the branching agent is methylene bis acrylamide (MBA) introduced at the rate of five to five thousand (5 to 5,000) parts per million by weight, preferably 5 to 2,000.

A non-limiting list of transfer agents is given below: isopropyl alcohol, sodium hypophosphite, mercaptoethanol, etc.

A person skilled in the art knows how to select the best combination according to his own knowledge and the present specification, and also from the examples that follow.

The (co)polymer serving as a basis for the Hofmann degradation reaction does not require the development of a particular polymerization method. The main polymerization techniques, well known to a person skilled in the art and usable are: precipitation polymerization, emulsion (aqueous or reverse) polymerization followed or not by a step of distillation and/or spray drying, and suspension polymerization or solution polymerization, these two techniques being preferred.

This base is characterized in that it has a molecular weight higher than 5,000 and without any upper limit.

The Hofmann degradation is then carried out by pouring on the base (preferably having a concentration higher than 10% by weight in aqueous solution) an alkaline solution of alkaline earth hypohalide and alkaline earth hydroxide, in steps or continuously, while absorbing the heat generated by the reaction and then pouring the whole into acid for decarboxylation to take place.

Once completed, the Hofmann degradation product is present in a concentration higher than 3.5% and generally higher than 4.5%.

Depending on the quantity of the alkaline solution of alkaline earth hypohalide and alkaline earth hydroxide introduced, variations in cationicity can be generated, associated with a quantity of amine functions produced on the carbon skeleton of the polymer.

Furthermore, it is possible to obtain a concentration of Hofmann degradation product in solution of about 10%, or even 15% or more, by using concentration methods such as ultrafiltration, diafiltration, and without any negative effect on the product.

2. Another method for preparing the "first" dry strength agent, also well known to a person skilled in the art, consists in an acidic or basic hydrolysis of a base (co)polymer of polyvinylformamide, and derivatives thereof.

In practice, the base polymer used comprises:

at least one nonionic monomer selected from the group comprising N-vinyl formamide, N-vinyl acetamide, N-vinylpyrrolidone and/or other groups such as vinyl acetate, and optionally:

at least one unsaturated cationic ethylene monomer, preferably selected from the group comprising monomers of the dialkylaminoalkyl (meth)acrylamide, diallylamine, methyldiallylamine and their quaternary ammonium or acidic salts. Mention can be made in particular of dimethyldiallylammonium chloride (DADMAC), acrylamido propyltrimethyl ammonium chloride (APTAC) and/or methacrylamido propyltrimethyl ammonium chloride (MAPTAC), and/or at least one nonionic monomer selected from the group comprising acrylamide (and/or methacrylamide), N,N dimethylacrylamide and/or acrylonitrile, and/or at least one anionic monomer of the acid or anhydride type selected for example from the group comprising (meth)acrylic acid, acrylamidomethylpropane sulphonic acid, itaconic acid, maleic anhydride, maleic acid, methallylsulphonic acid, vinylsulphonic acid and salts thereof.

It is important to note that, in combination with these monomers, it is also possible to use monomers insoluble in water such as acrylic, allyl or vinyl monomers comprising a hydrophobic group. During their use, these monomers are employed in very small quantities, lower than 20 moles percent, preferably lower than 10 moles percent, and they are preferably selected from the group comprising derivatives of acrylamide such as N-alkylacrylamide for example N-tert-butylacrylamide, octylacrylamide as well as N,N-dialkylacrylamides such as N,N-dihexylacrylamide, and the derivatives of acrylic acid such as alkyl acrylates and methacrylates.

In a manner known per se, the base polymer may also be branched. As is well known, a branched polymer is a polymer having branches, groups or branchings from its main ring, roughly arranged in a plane.

The branching can preferably be carried out during (or optionally after) the polymerization, in the presence of a branching agent and optionally a transfer agent. A non-limiting list of branching agents is given below: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxy or any other means well known to a person skilled in the art permitting cross-linkage.

In practice, the branching agent is methylene bis acrylamide (MBA) introduced at the rate of five to five thousand (5 to 5,000) parts per million by weight, preferably 5 to 2,000.

A non-limiting list of transfer agents is given below: isopropyl alcohol, sodium hypophosphite, mercaptoethanol, etc.

The base (co)polymer does not require the development of a particular polymerization method. The main polymerization techniques, well known to a person skilled in the art and usable are: precipitation polymerization, emulsion (aqueous or reverse) polymerization followed or not by a step of distillation and/or spray drying, and suspension polymerization or solution polymerization, these two techniques being preferred.

This base is characterized in that it has a molecular weight higher than 5,000 and without any upper limit.

Depending on the quantity of acid or caustic introduced during the hydrolysis, it is possible to generate different cationicities, associated with the quantity of amine functions produced on the carbon skeleton of the polymer.

In practice, the "first" dry strength agent is introduced as the first, second or third component of the system, preferably before the third agent, at one or more injection points, into the suspension at the rate of 100 g/t to 20,000 g/t by weight of active matter (polymer) compared to the dry weight of the fibrous suspension, preferably 500 g/t to 5,000 g/t. Furthermore, the "first" dry strength agent may be introduced in a mixture with the "second agent" (the organic (co)polymer having a cationic filler density higher than 0.1 meq/g) at one or more injection points.

The injection or introduction of the (co)polymer having a cationic filler density higher than 1 meq/g and having primary amine functions according to the invention is possible in a thick slurry, or in a thin slurry, that is, in the thick slurry mixing chests after refiners up to the white water circuit.

B. The "Second" Dry Strength Agent: the Synthetic Organic (Co)Polymer Having a Cationic Filler Density Higher than 0.1 Meq/g.

In practice, the "second agent" is a water-soluble synthetic organic polymer that is purely cationic or amphoteric having a cationic filler density higher than 0.1 meq/g and a molecular weight of at least 5000, obtained from:
  1 to 100 moles percent of at least one monomer having a cationic filler,
  and 0 to 99 moles percent of at least one monomer having a neutral and/or anionic filler.

The "second agent" may in particular be glyoxalated or not.

A non-limiting list of monomers which can be used are given below:
  a) among the cationic monomers, those selected from the group comprising dimethylaminoethyl acrylate (ADAME) and/or dimethylaminoethyl methacrylate (MADAME) quaternized or salified, dimethyldiallylammonium chloride (DADMAC), acrylamido propyltrimethyl ammonium chloride (APTAC) and/or methacrylamido propyltrimethyl ammonium chloride (MAPTAC),
  b) among the neutral monomers, the nonionic monomers selected from the group comprising acrylamide, methacrylamide, N,N dimethylacrylamide, N-vinyl pyrrolidone, N-vinyl acetamide, N-vinyl formamide, vinylacetate, esters acrylate, allyl alcohol,
  c) among the anionic monomers: mention can be made, and in a non-limiting manner, of the anionic monomers having a carboxylic function selected from the group comprising: acrylic acid, methacrylic acid, maleic acid, itaconic acid and salts thereof, those having a sulphonic acid function are selected from the group comprising 2-acrylamido-2-methylpropane sulphonic acid (AMPS), vinyl sulphonic acid, methallyl sulphonic acid and salts thereof, those having a phosphonic acid function.

In combination with these monomers, it is also possible to use monomers insoluble in water such as acrylic, allyl or vinyl monomers comprising a hydrophobic group. During their use, these monomers are employed in very small quantities, lower than 20 moles percent, preferably lower than 10 moles percent, and they are preferably selected from the group comprising derivatives of acrylamide such as N-alkylacrylamide for example N-tert-butylacrylamide, octylacrylamide as well as N,N-dialkylacrylamides such as N,N-dihexylacrylamide, and the derivatives of acrylic acid such as alkyl acrylates and methacrylates.

The "second agent" does not require any development of a particular polymerization process. It can be obtained by all the polymerization techniques well known to a person skilled in the art: gel polymerization, precipitation polymerization, emulsion (aqueous or reverse) polymerization followed or not by a step of distillation and/or spray drying, and suspension polymerization or solution polymerization.

According to a particular and preferred embodiment, the "second agent" is a synthetic (co)polymer having a cationic filler density higher than 0.1 meq/g and is branched. It is obtained by the addition, before and/or after the polymerization, of a branching agent in the presence or not of a transfer agent. In practice, when the branching agent is methylene bis acrylamide (MBA), it is introduced at the rate of five to five thousand (5 to 5,000) parts per million by weight, preferably 5 to 2,000.

A non-limiting list of branching agents is given below: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxy or any other means well known to a person skilled in the art permitting cross-linkage.

When the branching agent is glyoxal, it is added after the polymerization in a proportion of at least 0.5% of the (co) polymer to be glyoxalated.

In a particular embodiment, the (co)polymer having a cationic filler density higher than 0.1 meq/g is not glyoxalated.

A non-limiting list of transfer agents is given below: isopropyl alcohol, sodium hypophosphite, mercaptoethanol, etc.

In practice, the "second" dry strength agent is introduced at the first, second or third component of the system, at one or more injection points, into the suspension at the rate of 100 g/t to 20,000 g/t by weight of active matter (polymer) compared to the dry weight of the fibrous suspension, preferably 500 g/t to 5,000 g/t. Similarly, the "second agent" can be introduced in a mixture with the "first agent" at one or more injection points.

C. The "Third" Dry Strength Agent: the (Co)Polymer Having an Anionic Filler Density Higher than 0.1 Meq/g.

In practice, the "third agent" is a water-soluble synthetic organic polymer that is purely anionic or amphoteric having a cationic filler density higher than 0.1 meq/g and a molecular weight of at least 5000, obtained from:

1 to 100 moles percent of at least one monomer having an anionic filler, and 0 to 99 moles percent of at least one monomer having a neutral and/or cationic filler.

The "third agent" may particularly be glyoxalated or not.

A non-limiting list of monomers which can be used is given below:

a) among the anionic monomers, the anionic monomers having a carboxylic function selected from the group comprising acrylic acid, methacrylic acid, maleic acid, itaconic acid and salts thereof, those having a sulphonic acid function are selected from the group comprising 2-acrylamido-2-methylpropane sulphonic acid (AMPS), vinyl sulphonic acid, methallyl sulphonic acid and salts thereof, those having a phosphonic acid function, b) among the monomers having a neutral filler, the non-ionic monomers from the group comprising acrylamide, methacrylamide, N,N dimethylacrylamide, N-vinyl pyrrolidone, N-vinyl acetamide, N-vinyl formamide, vinylacetate, esters acrylate, allyl alcohol, c) among the cationic monomers, the cationic monomers selected from the group comprising dimethylaminoethyl acrylate (ADAME) and/or dimethylaminoethyl methacrylate (MADAME) quaternized or salified, dimethyldiallylammonium chloride (DADMAC), acrylamido propyltrimethyl ammonium chloride (APTAC) and/or methacrylamido propyltrimethyl ammonium chloride (MAPTAC).

In combination with these monomers, it is also possible to use monomers insoluble in water such as acrylic, allyl or vinyl monomers comprising a hydrophobic group. During their use, these monomers are employed in very small quantities, lower than 20 moles percent, preferably lower than 10 moles percent, and they are preferably selected from the group comprising derivatives of acrylamide such as N-alkylacrylamide for example N-tert-butylacrylamide, octylacrylamide as well as N,N-dialkylacrylamides such as N,N-dihexylacrylamide, and the derivatives of acrylic acid such as alkyl acrylates and methacrylates.

The "third agent" does not require any development of a particular polymerization process. It can be obtained by all the polymerization techniques well known to a person skilled in the art: gel polymerization, precipitation polymerization, emulsion (aqueous or reverse) polymerization followed or not by a step of distillation and/or spray drying, and suspension polymerization or solution polymerisation.

According to a particular and preferred embodiment, the "third" dry strength agent is a (co)polymer having an anionic filler density higher than 0.1 meq/g and is branched. It is obtained by the addition, before, during and/or after the polymerization, of a branching agent in the presence or not of a transfer agent. In practice, when the branching agent is methylene bis acrylamide (MBA), it is introduced at the rate of five to five thousand (5 to 5,000) parts per million by weight, preferably 5 to 2,000.

When the branching agent is glyoxal, it is added after the polymerization in a proportion of at least 0.5% of the (co) polymer to be glyoxalated.

A non-limiting list of branching agents is given below: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxy or any other means well known to a person skilled in the art permitting cross-linkage.

A non-limiting list of transfer agents is given below: isopropyl alcohol, sodium hypophosphite, mercaptoethanol, etc.

In practice, the "third" dry strength agent is introduced at the first, second or third component of the system, preferably after the first dry strength agent, at one or more injection points, into the suspension at the rate of 100 g/t to 20,000 g/t by weight of active matter (polymer) compared to the dry weight of the fibrous suspension, preferably 500 g/t to 5,000 g/t.

For reasons of marketing, an attempt is made to propose dry strength agents of the invention in their most concentrated possible form, using suitable concentration techniques well known to a person skilled in the art.

A final object of the invention is a sheet of paper or cardboard obtainable by the method previously described. This sheet is distinguished from the sheets of the prior art by its exceptional dry strength characteristics.

The following examples illustrate the invention without limiting its scope.

EXAMPLES

Presentation of Dry Strength Agents
a. The "First" Dry Strength Agent: Polyvinylamine
The polymers P1 and P2 were prepared.

P1: The polymer was obtained by a Hofmann degradation reaction on a homopolymer of acrylamide polymerized in aqueous solution containing 25% concentration and having a viscosity of 8,500 cps (molecular weight about 200,000). The Hofmann degradation was carried out at the temperature of 10° C. with sodium hypochlorite, sodium hydroxide and hydrochloric acid.

The product had a final concentration of 7% and a cationic filler of 6.2 meq/g.

P2: The polymer was obtained by basic hydrolysis of a homopolymer of vinylformamide polymerized in aqueous solution containing 25% concentration and having a viscosity of 36,000 cps (molecular weight about 300,000).

The hydrolysis was carried out with caustic at 80° C. for 5 h.

The product had a final concentration of 14.5% and a cationic filler of 6.2 meq/g.

b. The "Second" Dry Strength Agent: Cationic Resin
2 types of polymer are exemplified:

C1: This is an acrylamide/chloromethylated ADAME copolymer (65/35 moles percent) branched with MBA, polymerized in aqueous solution containing 15% concentration and having a viscosity of 3,000 cps.

C2: This is a glyoxalated acrylamide/DADMAC copolymer (95/5 moles percent). The base (before glyoxalation) was polymerized in aqueous solution containing 40% concentration and having a viscosity of 3,000 cps. The product after glyoxalation (30 wt % of glyoxal) had a viscosity of 20 cps and a concentration of 7.5%.

c. The "Third" Dry Strength Agent: Anionic Resin

The anionic resins tested were copolymers of acrylamide and acrylic acid salts obtained by solution polymerization at 15%. Some polymers have a linear structure and others branched. Furthermore, we also prepared an amphoteric linear polymer with an overall anionic filler (A3).

In the following examples, the following polymers are used:

| Anionic resin | Composition | Molar ratio | Anionicity (meq/g) | Structure | Viscosity of polymer solution (cps) |
|---|---|---|---|---|---|
| A1 | AM/AA | 70/30 | 3.85 | Linear | 2,500 |
| A2 | AM/AA | 70/30 | 3.85 | Branched (MBA) | 2,500 |
| A3 | AM/AA/ ADAME MeCl | 83/10/7 | 0.48 | Linear | 9,000 |
| A4 | AM/AA | 55/28/17 (glyoxal) | 3.75 | Branched (glyoxal) | 2,500 |

AA = Sodium acrylate
AM = Acrylamide
ADAME MeCl = Chloromethylated dimethylaminoethyl acrylate Procedure for Testing Dry Strength Properties The paper handsheets are prepared with an automatic dynamic handsheet machine. The pulp is first prepared by disintegrating 90 grams of virgin kraft fibres in 2 litres of hot water for 30 minutes. The slurry obtained is then diluted to a total volume of 9 litres. Once the consistency is measured accurately, the necessary quantity of this slurry is withdrawn in order to finally obtain a sheet with a weight of 60 g/m$^2$.

The slurry is then introduced into the chest of the dynamic handsheet machine, diluted to a consistency of 0.32% and moderately stirred with a mechanical stirrer to homogenize the fibrous suspension.

In manual mode, the slurry is pumped to the nozzle to prime the circuit.

A blotter and the papermaking wire cloth are placed in the bowl of the dynamic handsheet machine before rotating the bowl at 900 rpm and constructing the waterwall. The different dry strength agents are then introduced into the stirred fibrous suspension with a contact time of 30 seconds for each polymer. The sheet is then prepared (in automatic mode) by 22 return trips of the nozzle projecting the slurry into the waterwall. Once the water is drained and the automatic sequence is terminated, the wire cloth with the fibre network is removed from the bowl of the dynamic handsheet machine and placed on a table. A dry blotter is placed on the side of the wet fibre pad and pressed once with a roller. The whole is turned over and the wire cloth is delicately separated from the fibre pad. A second dry blotter is placed on the sheet (between the two blotters) and pressed once under a press delivering 4 bar and then dried in a stretched drier for 9 min at 107° C. The two blotters are then removed and the sheet is stored overnight in a room with controlled humidity and temperature (50% relative humidity and 23° C.). The dry and wet strength properties of all the sheets obtained by this procedure are then determined.

Burst strength is measured with a Messmer Buchel M 405 burst tester (mean of the 14 measurements).

The wet tensile strength and/or tensile energy absorbed (TEA) are measured in the machine direction with a Testometric AX tensile tester (mean of 5 samples).

The wet tensile strength is measured in the machine direction with a Testometric AX tensile tester after the sample has been soaked for 20 seconds in a Finch cell filled with deionized water (mean of 5 samples).

In all the following examples, unless otherwise indicated, the paper sheets are prepared by the above procedure, introducing them by following the order of introduction presented in the tables.

The tests are performed with a neutral pH slurry. The tests annotated (inv) correspond to those of the invention.

TABLE 1

Effect associated with the "first" dry strength agent: polyvinylamine

| Sheet No. | 1$^{st}$ product | 2$^{nd}$ product | 3$^{rd}$ product | Burst index | Dry tensile strength (km) | Dry TEA (j/m$^2$) | Wet tensile strength (m) |
|---|---|---|---|---|---|---|---|
| Control | — | — | — | 1.436 | 3.760 | 40.24 | 40 |
| 1 | C1 | A2 | — | 1.975 | 4.437 | 53.51 | 146 |
| 2 (inv) | C1 | P1 | A2 | 2.130 | 4.646 | 60.01 | 215 |
| 3 (inv) | C1/P1 (in mixture) | | A2 | 2.003 | 4.530 | 61.86 | 225 |
| 4 | C2 | A2 | — | 1.875 | 3.973 | 49.61 | 286 |
| 5 (inv) | C2 | P1 | A2 | 2.330 | 4.620 | 66.63 | 591 |
| 6 (inv) | C2 | P2 | A2 | 2.361 | 4.591 | 68.16 | 493 |

Proportions in sheets 1 and 4: 1$^{st}$ product = 0.55%; 2$^{nd}$ product = 0.30%
Proportions in sheets 2, 3, 5, 6: 1$^{st}$ product = 0.30%; 2$^{nd}$ product = 0.25%; 3$^{rd}$ product = 0.30%

The table above demonstrates the unexpected effect resulting from the use of a polyvinylamine ("first" dry strength agent) in combination with a conventional two-component type of system. It is also found that a polyvinylamine issuing from a Hofmann degradation or a polyvinylformamide hydrolysis serve to obtain an identical dry strength level.

Remark: It should be observed that polymer C2 has a substantial negative effect on the wet strength, causing process difficulties such as during the reduction of the sheet to pulp for recycling dry fragments.

TABLE 2

Synergy provided by the three-component system

| Sheet No. | 1st product | 2nd product | 3rd product | Burst index | Wet tensile strength (m) | Dry TEA (j/m²) |
|---|---|---|---|---|---|---|
| Control | — | — | — | 1.436 | 3.760 | 40.24 |
| 7 | C2 | — | — | 1.800 | 3.901 | 42.05 |
| 8 | P1 | — | — | 1.470 | 3.822 | 41.36 |
| 9 | C2 | P1 | — | 1.996 | 3.950 | 53.03 |
| 4 | C2 | A2 | — | 1.875 | 3.973 | 49.61 |
| 1 | C1 | A2 | — | 1.975 | 4.437 | 53.51 |
| 5 (inv) | C2 | P1 | A2 | 2.330 | 4.620 | 66.63 |
| 2 (inv) | C1 | P1 | A2 | 2.130 | 4.646 | 60.01 |

Proportions in sheets 7 and 8: 1st product = 0.55%;
Proportions in sheets 9, 4 and 11: 1st product = 0.55%; 2nd product = 0.30%;
Proportions in sheets 5 and 2: 1st product = 0.30%; 2nd product = 0.25%; 3rd product = 0.30%

These results clearly show that only the synergy of the three dry strength agents of the invention serves to obtain the unequalled performance levels that cannot be obtained by conventional systems with one or two components.

TABLE 3

Effect of proportioning

| Sheet No. | 1st product | 2nd product | 3rd product | Burst index | Wet tensile strength (m) | Dry TEA (j/m²) |
|---|---|---|---|---|---|---|
| Control | | | | 1.436 | 3.760 | 40.24 |
| 2 (inv) | 0.3 | 0.25 | 0.3 | 2.130 | 4.646 | 60.01 |
| 10 (inv) | 0.3 | 0.17 | 0.2 | 2.025 | 4.486 | 58.74 |
| 11 (inv) | 0.3 | 0.1 | 0.15 | 1.997 | 4.466 | 56.84 |
| 5 (inv) | 0.3 | 0.25 | 0.3 | 2.330 | 4.620 | 66.63 |
| 12 (inv) | 0.3 | 0.17 | 0.2 | 2.316 | 4.585 | 63.45 |
| 13 (inv) | 0.3 | 0.1 | 0.15 | 2.327 | 4.528 | 62.35 |
| 14 | 0.25 | 0.3 | — | 1.908 | 4.403 | 55.43 |

Sheets 2, 10 and 11: 1st product = C1; 2nd product = P1; 3rd product = A2
Sheets 5, 12 and 13: 1st product = C2; 2nd product = P1; 3rd product = A2
Sheets 14: 1st product = P1; 2nd product = A2 (two-component system)

The table above shows that the synergy between the three products is affected even in low proportions.

Sheets 5 and 13 show that the lowering of the total proportion from 0.85% to 0.55% does not substantially decrease performance.

Similarly, sheets 13 and 14 show that with an identical total proportion the combination of the three agents of the invention serves to obtain much higher dry strength levels than the combination of polyvinylamine+anionic polymer, which is nevertheless already very efficient (cf. FR 05.50135).

TABLE 4

Effect of type of anionic polymer used as anionic resin

| Sheet No. | 1st product | 2nd product | 3rd product | Burst index | Wet tensile strength (m) | Dry TEA (j/m²) |
|---|---|---|---|---|---|---|
| Control | — | — | — | 1.436 | 3.760 | 40.24 |
| 15 (inv) | C2 | P1 | A1 | 2.247 | 4.592 | 65.87 |
| 5 (inv) | C2 | P1 | A2 | 2.330 | 4.620 | 66.63 |
| 16 (inv) | C2 | P1 | A3 | 2.203 | 4.498 | 63.12 |
| 17 (inv) | C2 | P1 | A4 | 2.191 | 4.486 | 63.09 |

It appears clearly that the dry strength is increased by using a branched polymer (A2) rather than a linear polymer (A1) as the anionic resin. It should also be noted that an amphoteric polymer (A3) or a glyoxalated anionic polymer (A4) serve to obtain the same very satisfactory level of performance.

The invention claimed is:

1. Method for fabricating a sheet of paper and/or cardboard and the like, comprising, before formation of the sheet from a fibrous suspension, adding to the fibrous suspension, separately or mixed, in any order of introduction, at one or more injection points, at least three dry strength agents respectively:
    a first agent corresponding to a (co)polymer having a cationic filler density higher than 1 meq/g and having primary amine functions,
    a second agent corresponding to a synthetic organic (co)polymer having a cationic filler density higher than 0.1 meq/g,
    and a third agent corresponding to a (co)polymer having an anionic filler density higher than 0.1 meq/g.

2. Method according to claim 1, wherein the first agent corresponds to a Hofmann degradation product on a base (co)polymer comprising:
    at least one nonionic monomer selected from the group comprising acrylamide and/or methacrylamide, N,N dimethylacrylamide and/or acrylonitrile.

3. Method according to claim 2, wherein the Hofmann degradation product is present in a concentration higher than 3.5%.

4. Method according to claim 1, wherein the first agent is obtained by acidic or basic hydrolysis of a base (co)polymer comprising:
    at least one nonionic monomer selected from the group comprising N-vinylformamide, N-vinylacetamide, N-vinylpyrrolidone, and N-vinylacetate.

5. Method according to claim 2, wherein the base (co)polymer is branched.

6. Method according to claim 1, wherein the first agent is introduced into the suspension at a rate of 100 g/t to 20,000 g/t by weight of active polymer matter compared to dry weight of the fibrous suspension.

7. Method according to claim 1, wherein the second agent is obtained from:
    1 to 100 moles percent of at least one monomer having a cationic filler,
    and 0 to 99 moles percent of at least one monomer having a neutral and/or anionic filler.

8. Method according to claim 7, wherein the second agent is branched in the presence of a branching agent.

9. Method according to claim 8, wherein the branching agent comprises glyoxal.

10. Method according to claim 7, wherein the second agent is not glyoxalated.

11. Method according to claim 7, wherein:
    the at least one monomer having a cationic filler is selected from the group comprising dimethylaminoethyl acrylate (ADAME) and/or dimethylaminoethyl methacrylate (MADAME) quaternized or salified, dimethyldiallylammonium chloride (DADMAC), acrylamido propyltrimethyl ammonium chloride (APTAC) and/or methacrylamido propyltrimethyl ammonium chloride (MAPTAC),
    the at least one monomer having a neutral filler comprises nonionic monomers selected from the group comprising acrylamide, methacrylamide, N,N dimethylacrylamide, N-vinyl pyrrolidone, N-vinyl acetamide, N-vinyl formamide, vinylacetate, esters acrylate, allyl alcohol, and the at least one monomer having an anionic filler comprises monomers having a carboxylic function selected from the group comprising acrylic acid, methacrylic acid, maleic acid, itaconic acid and salts thereof, monomers having a sulphonic acid function are selected from the group comprising 2-acrylamido-2-methylpropane sulphonic (AMPS), vinyl sulphonic acid, methallyl sulphonic acid and salts thereof, and monomers having a phosphonic acid function.

12. Method according to claim 1, wherein the second agent is introduced into the suspension at a rate of 100 g/t to 20,000 g/t by weight of active polymer matter compared to dry weight of the fibrous suspension.

13. Method according to claim 1, wherein the third agent is obtained from:
  1 to 100 moles percent of at least one monomer having an anionic filler,
  and 0 to 99 moles percent of at least one monomer having a neutral and/or cationic filler.

14. Method according to claim 13, wherein the third agent is branched in the presence of a branching agent.

15. Method according to claim 14, wherein the branching agent comprises glyoxal.

16. Method according to claim 13, wherein:
  the at least one monomer having an anionic filler comprises monomers having a carboxylic function selected from the group comprising acrylic acid, methacrylic acid, maleic acid, itaconic acid and salts thereof, monomers having a sulphonic acid function selected from the group comprising 2-acrylamido-2-methylpropane sulphonic (AMPS), vinyl sulphonic acid, methallyl sulphonic acid and salts thereof, and monomers having a phosphonic acid function,
  the at least one monomer having a neutral filler comprises nonionic monomers selected from the group comprising acrylamide, methacrylamide, N,N dimethylacrylamide, N-vinyl pyrrolidone, N-vinyl acetate, N-vinyl formamide, vinylacetate, esters acrylate, allyl alcohol,
  the at least one monomer having a cationic filler is selected from the group comprising dimethylaminoethyl acrylate (ADAME) and/or dimethylaminoethyl methacrylate (MADAME) quaternized or salified, dimethyldiallylammonium chloride (DADMAC), acrylamido propyltrimethyl ammonium chloride (APTAC) and/or methacrylamido propyltrimethyl ammonium chloride (MAPTAC).

17. Method according to claim 1, wherein the third agent is introduced into the suspension at a rate of 100 g/t to 20,000 g/t by weight of active polymer matter compared to dry weight of the fibrous suspension.

18. Method according to claim 1, wherein the first, second and third agents are introduced into the fibrous suspension at a rate of 0.01 to 2% by weight of active polymer matter compared to dry weight of the fibrous suspension.

19. Sheet of paper or cardboard obtained by the method according to claim 1.

20. Method according to claim 2, wherein the base (co) polymer further comprises:
  at least one unsaturated cationic ethylene monomer, selected from the group comprising monomers of the dialkylaminoalkyl (meth)acrylamide, diallylamine, methyldiallylamine and their quaternary ammonium or acidic salts,
  and/or at least one nonionic monomer selected from the group comprising N-vinyl acetamide, N-vinyl formamide, N-vinylpyrrolidone and/or vinyl acetate,
  and/or at least one anionic monomer of an acid or anhydride type selected from the group comprising (meth) acrylic acid, acrylamidomethylpropane sulphonic acid, itaconic acid, maleic anhydride, maleic acid, methallylsulphonic acid, vinylsulphonic acid and salts thereof.

21. Method according to claim 3, wherein the Hofmann degradation product is present in a concentration higher than 4.5%.

22. Method according to claim 4, wherein the base (co) polymer further comprises:
  at least one unsaturated cationic ethylene monomer, selected from the group comprising monomers of dialkylaminoalkyl (meth)acrylamide, diallylamine, methyldiallylamine and their quaternary ammonium or acidic salts,
  and/or at least one nonionic monomer selected from the group comprising acrylamide and/or methacrylamide, N,N dimethylacrylamide and/or acrylonitrile,
  and/or at least one anionic monomer of an acid or anhydride type selected from the group comprising (meth) acrylic acid, acrylamidomethylpropane sulphonic acid, itaconic acid, maleic anhydride, maleic acid, methallylsulphonic acid, vinylsulphonic acid and salts thereof.

23. Method according to claim 6, wherein the rate comprises 500 g/t to 5,000 g/t.

24. Method according to claim 12, wherein the rate comprises 500 g/t to 5,000 g/t.

25. Method according to claim 17, wherein the rate comprises 500 g/t to 5,000 g/t.

* * * * *